(12) United States Patent
Barron

(10) Patent No.: US 8,785,064 B2
(45) Date of Patent: Jul. 22, 2014

(54) AERO-THERMAL ENERGY TECHNOLOGY PLATFORM USING RECYCLED ENERGY WITH ENDOTHERMIC DECOMPOSITION

(76) Inventor: Brian Hughes Barron, Seattle, WA (US)

( * ) Notice: Subject to any disclaimer, the term of this patent is extended or adjusted under 35 U.S.C. 154(b) by 691 days.

(21) Appl. No.: 12/808,652

(22) PCT Filed: Dec. 8, 2008

(86) PCT No.: PCT/US2008/085888
§ 371 (c)(1),
(2), (4) Date: Apr. 21, 2011

(87) PCT Pub. No.: WO2009/079260
PCT Pub. Date: Jun. 25, 2009

(65) Prior Publication Data
US 2011/0189557 A1    Aug. 4, 2011

Related U.S. Application Data

(60) Provisional application No. 61/014,663, filed on Dec. 18, 2007.

(51) Int. Cl.
H01M 8/06    (2006.01)
(52) U.S. Cl.
USPC ........................................................ 429/416

(58) Field of Classification Search
None
See application file for complete search history.

(56) References Cited

U.S. PATENT DOCUMENTS

| | | | |
|---|---|---|---|
| 2004/0229098 A1* | 11/2004 | Fujita | 429/25 |
| 2007/0031325 A1 | 2/2007 | Carruthers et al. | |
| 2007/0234743 A1 | 10/2007 | Assaf | |
| 2007/0274905 A1 | 11/2007 | Wynn | |

* cited by examiner

*Primary Examiner* — Patrick Ryan
*Assistant Examiner* — Wyatt McConnell
(74) *Attorney, Agent, or Firm* — Merchant & Gould PC.

(57) ABSTRACT

A scalable endothermic reaction apparatus, system and method captures, concentrates, and converts atmospheric heat and humidity into diatomic hydrogen and stoichiometric oxygen for use within an exothermic device such as an engine, a turbine, or a fuel cell. No nitrogen or carbon compounds are introduced into the process utilized by the apparatus. All operating matter and energy utilized in the process is recycled in a closed loop system. Energy emitted from the exothermic device as waste is captured and immediately returned as waste hot water to the endothermic device. The waste output of the work-producing device is thus an exploitable asset that can be repeatedly returned in service through the endothermic device, without any emissions from an exhaust or tailpipe in the system. At peak efficiency, the exothermic and endothermic processes are formed as an apparatus that is thermally sealed in a free-standing and self-sustaining operating package.

12 Claims, 1 Drawing Sheet

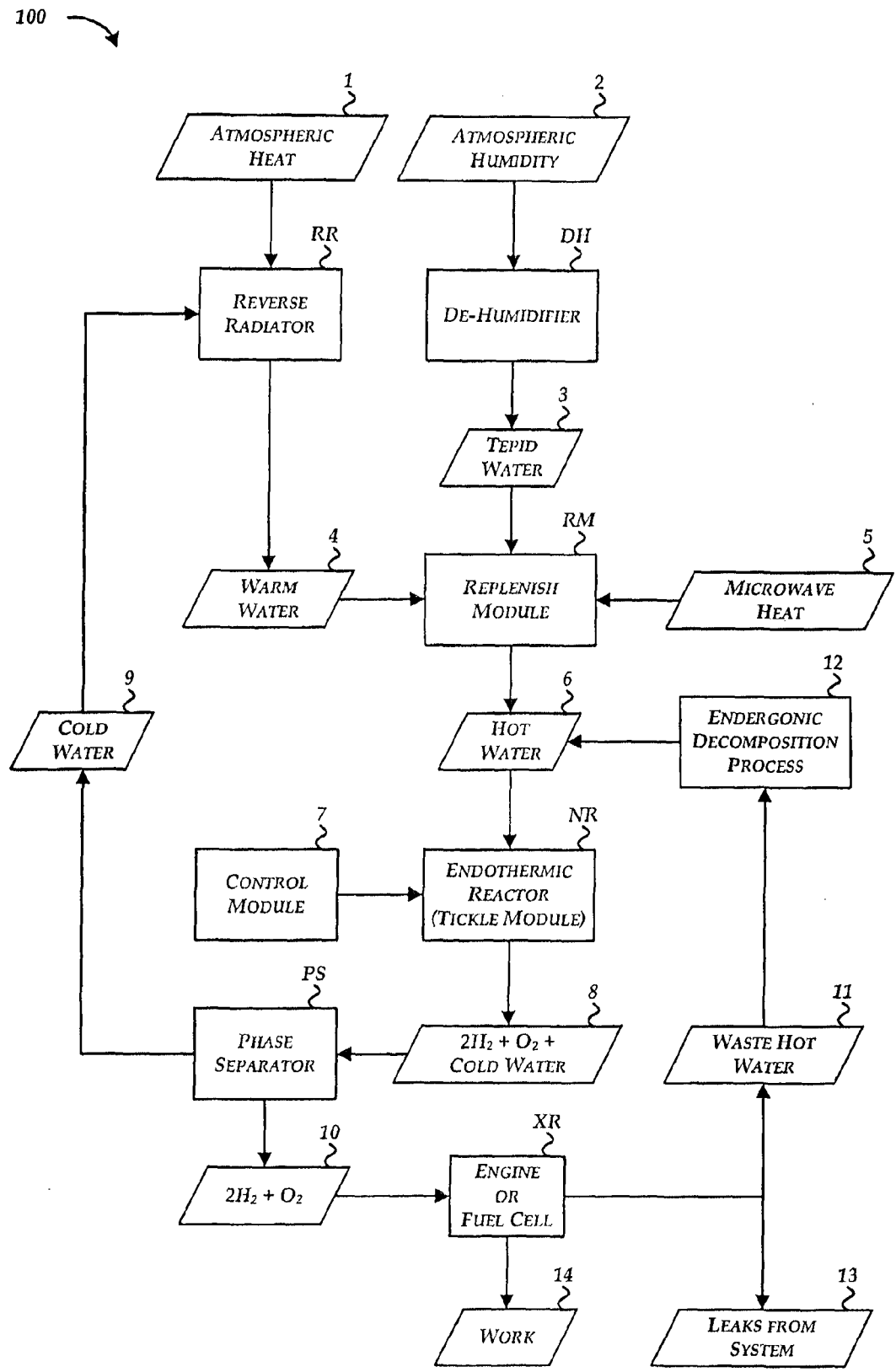

AERO-THERMAL ENERGY TECHNOLOGY PLATFORM USING RECYCLED ENERGY WITH ENDOTHERMIC DECOMPOSITION

This application is being filed on 16 Jun. 2010, as a US National Stage of PCT International Patent application No. PCT/US2008/085888, filed 8 Dec. 2008 in the name of Brian Hughes Barron, a citizen of the U.S., applicant for the designation of all countries, and claims priority to U.S. Provisional Patent Application Ser. No. 61/014,663, filed Dec. 18, 2007 and is incorporated by reference herein. To the extent appropriate, a claim of priority is made to each of the above disclosed applications.

FIELD OF INVENTION

The present disclosure is generally directed to a system, apparatus, and process for generating energy as a fuel for an exothermic reactor such as an internal combustion engine, a turbine engine, or a fuel cell. Atmospheric heat and humidity are captured, concentrated and converted into diatomic hydrogen and stoichiometric oxygen, which can then be used as a fuel and oxidizer for the exothermic reactor. This disclosure illustrates key components and methods that can be adapted to extract and utilize energy from the atmosphere. The described technology can thus form the basis for an aero-thermal energy technology platform, which can be distinguished from solar-thermal and geo-thermal energy platforms.

BACKGROUND

For more than a dozen decades the industrialized countries of the world have increased their manufacture and deployment of exothermic devices to improve their standards of living. Cars, furnaces, hot water heaters, bar-b-que grills, and even lawn mowers collectively now number in the billions of units operating in our societies. Such devices typically require a carbon-based fuel such as petroleum based fuels, natural gas and propane gas.

The fuels to power these devices are finite, and ever more difficult to extract, process, transport, and clean up. The present disclosure identifies that an enabling and benign technology is needed as an alternative fuel that maintains and sustains our fuel needs such that our standards of living and those of the many other developing nations can continue to improve and grow. It is thus desired that the presently disclosed system and method utilizes a self balancing closed-loop process that generates a form of fuel that is renewable and reusable similar to other processes that occur in nature. The generation of renewable fuels can dramatically alter the foreign trade and financial drains on most countries, especially those with huge energy appetites.

Most modern equipment and vehicles such as petroleum based combustion engines consume large quantities of fuel while emitting energy in the form of heat and exhausted gases that can contribute directly to pollution and global warming. The present disclosure has identified an effective, and heretofore overlooked approach to the multifaceted dilemmas presented by fossil fuels, global warming, and high energy costs. As will be described in detail herein, a coupled endothermic device can be used to feed, balance, and recycle the effluent of most of the exothermic devices in our society. Instead of emitting energy and matter, the described endothermic system and methods extract atmospheric heat and humidity as well as recycle waste products from the exothermic device itself.

Since the early 1970s, the United States of America has quickly innovated but gradually deployed the now-ubiquitous catalytic converter to reform the harmful automobile emissions to more benign compounds. More than 300 million catalytic converters have been installed on cars over the past 35+ years. By coupling an endothermic reactor to a mobile exothermic reactor such as a motor vehicle engine, a decentralized energy economy can be scalably and rapidly introduced in many countries simultaneously. This build-out will minimize the need to develop any extensive or expensive centralized infrastructures to achieve a vibrant, cost effective, and pollution free hydrogen economy.

BRIEF DESCRIPTION OF THE DRAWINGS

FIG. 1 is a block diagram illustrating an example exothermic reactor configured in accordance with some embodiments of the present disclosure.

DETAILED DESCRIPTION

Various embodiments will be described in detail with reference to the drawings, where like reference numerals represent like parts and assemblies throughout the several views. References to various embodiments do not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. The meaning of "in" may include "in" and "on." The term "connected" may mean a direct electrical, electro-magnetic, mechanical, logical, or other connection between the items connected, without any electrical, mechanical, logical or other intermediary items. The term "coupled" can mean a direct connection between items, an indirect connection through one or more intermediaries, or communication between items in a manner that may not constitute a physical connection.

Briefly stated, the present disclosure relates to a method and apparatus that captures, concentrates and converts atmospheric heat and humidity into diatomic hydrogen and stoichiometric oxygen for immediate use as fuel and oxidizer in an exothermic reactor such as an internal combustion engine, a turbine engine, or a fuel cell.

FIG. 1 is a block process flow diagram illustrating an example endothermic reactor for converting hot water into hydrogen and oxygen for use in, and coupled to, an exothermic reactor which produces work, all arranged in accordance with at least some aspects of the present disclosure.

Atmospheric heat (1) is captured by a reverse radiator (RR). The reverse radiator (RR) is arranged to process cold water (9) to generate warm water (4) using the captured atmospheric heat. Atmospheric humidity (2) is captured by a de-humidifier (DH), which is arranged to generate tepid water (3) from the captured atmospheric humidity. A replenish module (RM) is arranged to process the tepid water (3) and the warm water (4) to generate hot water (6).

Depending on the ambient environment where the apparatus is located, it may be necessary to augment the heat of the hot water (6) that is generated by the replenish module (RM)

with additional heat that can be generated from a microwave heat source (5) or any other reasonable auxiliary heat source. Example heat sources may include infrared heat sources, convection heat sources, radiant heat sources, solar reflector based heat sources, as well as any other heat source.

The hot water (6) is fed to an endothermic reactor (NR), which is arranged to convert the hot water into diatomic hydrogen and stoichiometric oxygen via an endothermic chemical reaction. A control module (7) is used to manage and maintain the proper operation of the endothermic reactor (NR). Cold remainder water (8) is generated as a byproduct of the endothermic decomposition since the water molecules give up their heat. The gas outputs (i.e., diatomic hydrogen and stoichiometric oxygen) from the endothermic reactor (NR) are commingled with cold remainder water (8), which is then provided to a phase separator (PS).

The phase separator (PS) is arranged to separate the cold water (9) and the gases (10) from the commingled remainder water. The phase separator (PS) is arranged to separate the fluids. The separated cold remainder water (9) gives up its heat to form the coupling bonds of the hydrogen and oxygen molecules, and is routed back to the intake side of the reverse radiator (RR) to capture more atmospheric heat (1) from the ambient environment. The phase separator also routes the separated gases (10, diatomic hydrogen and stoichiometric oxygen) to the exothermic reactor (XR) which can of any reasonable type such as an engine or fuel cell (e.g., combustion in an internal combustion engine, electricity generated in the fuel cell, as well as other conventionally known exothermic processes).

After the exothermic reactor (XR) has processed the gases (10), the resultant waste hot water (11) is returned to the endothermic reactor (NR) via the endergonic decomposition process unit (12), thus conserving and reusing both matter and energy as hot water 6. In order to maximize the conservation of hot water 6, the entire apparatus illustrated in FIG. 1 should be thermally sealed.

FIG. 1 illustrates that atmospheric heat (1), atmospheric humidity (2), and optionally microwave heat (5) are processed by the various components and/or processes to create energy with an endothermic reaction, where the resulting gases are processed for use by some sort of exothermic reactor (XR). Control module 7 is arranged to monitor and maintain the flow of the cold water (9), warm water (4), tepid water (3), hot water (6) commingled water (8) and waste hot water (11) such that an equilibrium is reached without excessive pressure. Leaks in the system (13) are avoided by maintaining a dynamic equilibrium in the various processes. The heat from the exothermic reactor (XR) is converted to work (14), which can be in any reasonable form (e.g., rotational motion, linear motion, etc.) The control module 7 thus maintains the closed loop operation of the system so that minimal atmospheric resources can be utilized for indefinite periods of operation.

As described above, the described processes and methods may be utilized as an aero-thermal technology platform that uses recycled energy with endothermic decomposition. In general, the described systems and methods illustrate a form of applied endothermics. The term aero-thermal refers to processes and methods relating to or utilizing heat and humidity from the earth's atmosphere that are endothermically captured and converted into diatomic hydrogen and stoichiometric oxygen (e.g., see definition of geothermal), wherein both the captured and waste energy and matter correspond to the same resources. More generally speaking, the water resources described herein are recycled so that the same water resources that are utilized as an input fuel for the described system are re-used and thus serve as both an input and output of the closed loop system. For example, hot water (6) is an input to the endothermic reactor (NR), and the waste hot water (11) output from the engine or fuel cell is recycled by the endergonic decomposition process (12) and re-circulated into the input hot water (6). Similarly, the cold water (9) from the output of the phase separator (PS) is recycled by the reverse radiator (RR) to generate additional warm water (4), again feeding into the other system modules.

The described aero-thermal processes can be arranged to collaboratively generate power along side existing geo-thermal processes (e.g., fuel burning processes) such as in a co-generation type process, along side existing solar-thermal technology process, along side existing turbine-flow technology processes (e.g., wind turbines, hydro-turbines, etc.) or as any appropriate combination or replacement of such existing processes. It is thus envisioned that the described processes can be utilized in the fields of utility power generation/co-generation stations, automotive power generators, automotive engines, diesel engines, marine engines, railroad locomotive engines, farm machinery engines, golf cart engines, all forms and sizes of fuel cells, and all forms and sizes of turbines.

The above specification, examples and data provide a complete description of the manufacture and use of the composition of the invention. Since many embodiments of the invention can be made without departing from the spirit and scope of the invention, the invention resides in the claims hereinafter appended and all reasonable equivalents thereof.

I claim:

1. An apparatus for generating work from atmospheric heat and atmospheric humidity, comprising: a reverse radiator that is arranged to generate warm water by capturing and concentrating the atmospheric heat; a de-humidifier that is arranged to generate tepid water by capturing and concentrating the atmospheric humidity; a replenish module that is connected to the reverse radiator and de-humidifier and arranged to generate hot water from the warm water and the tepid water; an endothermic reactor that is arranged to generate a commingled mixture of gas and water by converting the hot water into diatomic hydrogen and stoichiometric oxygen; a phase separator that is arranged to process the commingled mixture of gas and water to separate the cold water and the gas from the commingled mixture, wherein the cold water from the endothermic reactor is coupled to the intake side of the reverse radiator, and wherein the gas comprises the diatomic hydrogen and stoichiometric oxygen; and an exothermic reactor that is arranged to generate work from the separated gas.

2. The apparatus of claim 1, wherein the exothermic reactor is one member of the group comprising an internal combustion engine, a turbine, or a fuel cell.

3. The apparatus of claim 1, wherein a waste output of the exothermic reactor is a waste hot water, and wherein the waste hot water is recycled and returned to an intake of the endothermic reactor for reuse.

4. The apparatus of claim 3, wherein the waste hot water is endergonicly decomposed into hydrogen and oxygen.

5. The apparatus of claim 1, wherein an output of the exothermic reactor is coupled to an input of the endothermic reactor.

6. The apparatus of claim 5, wherein the endothermic reactor is coupled to the exothermic reactor in a thermally sealed closed loop operation.

7. The apparatus of claim 1, wherein an input of the exothermic reactor is coupled to an output of the endothermic reactor.

8. The apparatus of claim 7, wherein the endothermic reactor is coupled to the exothermic reactor in a thermally sealed closed loop operation.

9. The apparatus of claim 1, wherein operating fluids utilized by the exothermic reactor and the endothermic reactor are substantially free of carbon, nitrogen, carbon compounds, and nitrogen compounds.

10. The apparatus of claim 1, wherein none of the operating fluids utilized by the exothermic reactor are discharged to the ambient atmosphere in a closed-loop operating system.

11. The apparatus of claim 1, wherein the apparatus is adapted to produce the diatomic hydrogen and stoichiometric oxygen from water in response to the endothermic reaction and wherein the endothermic reactor includes an output port for outputting said hydrogen and oxygen, and further comprising an exothermic device that includes an input port arranged for receiving the hydrogen and stoichiometric oxygen, wherein the exothermic device is selected from the group consisting of: an internal combustion engine, a gas turbine engine, a stove, a heater, a furnace, a reciprocating piston engine, a distillation unit, a water purification unit, or a hydrogen/oxygen flame jet.

12. The apparatus of claim 1, wherein both the captured energy and waste of both matter and energy correspond to the same resource.

* * * * *